United States Patent [19]

West et al.

[11] Patent Number: 4,602,050

[45] Date of Patent: Jul. 22, 1986

[54] METHOD FOR CROSS-LINKING ORGANOPOLYSILANE POLYMERS

[75] Inventors: Robert C. West, Madison, Wis.; Peter I. Djurovich, Isla Vista, Calif.

[73] Assignee: Wisconsin Alumni Research Foundation, Madison, Wis.

[21] Appl. No.: 720,596

[22] Filed: Apr. 8, 1985

[51] Int. Cl.$^4$ .................... C08L 83/16; C07F 7/08
[52] U.S. Cl. .................... 522/135; 522/145; 522/148; 525/479; 528/25; 528/32; 528/33; 556/430; 556/435
[58] Field of Search .......... 525/479; 204/159.13; 556/430, 435; 528/32, 33, 25; 522/135, 145, 148

[56] References Cited

U.S. PATENT DOCUMENTS 3,496,206  2/1970  Berger .................... 556/435
4,546,163  10/1985  Haluska .................... 528/25

FOREIGN PATENT DOCUMENTS 0594250  3/1960  Canada .................... 525/479
1173255  7/1964  Fed. Rep. of Germany ...... 525/479

OTHER PUBLICATIONS

Radiation Crosslinking of Poly(vinyl Chloride); W. A. Salmon et al., *Journal of Applied Polymer Science*, vol. 16, pp. 671–682 (1972).

R. D. Miller, et al., "Soluble Polysilane Derivatives: Interesting New Radiation-Sensitive Polymers," *Materials for Microlithography*, L. F. Thompson, et al., Eds., ACS Sym. Series, American Chemical Society: Washington, D.C., 1984, pp. 293–310.

Peter Trefonas, III, (1985), "Polysilane High Polymers: Mechanism of Photodegradation", *J. Am. Chem. Soc.*, 107, 2737–2742.

*Primary Examiner*—Wilbert J. Briggs, Sr.
*Attorney, Agent, or Firm*—David J. Houser

[57] ABSTRACT

A method for cross-linking organopolysilane polymers. The method includes the steps of mixing an organopolysilane with a cross-linking agent to make a reaction mixture. The cross-linking agent includes molecules having at least two carbon-carbon double bonds and a ratio of such bonds to the molecular weight of the molecule of at least 1:150. Radical formation is then induced in the organopolysilane of the reaction mixture to cause formation of a reaction product including cross-linked organopolysilane polymers.

13 Claims, No Drawings

METHOD FOR CROSS-LINKING ORGANOPOLYSILANE POLYMERS

This invention was made with Government support under the Air Force Office of Scientific Research Grants Nos. AFOSR-83-0248; F49620-83-C-0044; and F49620-86-C-0010. The Government has certain rights in this invention.

TECHNICAL FIELD

The present invention relates to organopolysilane polymers in general and, in particular, to a method for the production of cross-linked organopolysilane polymers. "Organopolysilane polymer," as used herein, shall refer to a multiorganosubstituted, saturated silicon chain.

BACKGROUND OF ART

Organopolysilane polymers are useful as precursors for the production of silicone carbide fibers. In addition, the polymers are useful as a lithiographic resist material for use in the manufacture of integrated circuits. A fact important to both of these applications is that organopolysilane polymers can become cross-linked when exposed to ultraviolet radiation. However, not all organopolysilanes become cross-linked upon being so irradiated. Instead, some organopolysilanes degrade under UV radiation, without useful cross-linking. In certain applications, the ability to thermally induce cross-linking in organopolysilane polymers would also be useful. For example, the material would have utility as a binder for ceramic composite structures.

Those skilled in the art are cognizant of the use of certain polyvinyl compounds as thermal and radiation-activated cross-linking agents in carbon based polymers. For example, see W. A. Salmon and L. D. Loan, "Radiation Cross-linking of Poly(vinyl Chloride)", *Journal of Applied Polymer Science* (1972), 16, 671–682. In *Salmon and Loan*, an electron beam was used for irradiating polyvinyl chloride that had been mixed with such cross-linking agents as n-butyl methacrylate, tetraethylene glycol dimethacrylate, tetraethylene glycol diacrylate, trimethylolpropane trimethacrylate, and trimethylolpropane triacrylate.

The inducement of cross-linking in organopolysilane polymers by use of a polyvinyl compound as a cross-linking agent has not been reported. Likewise, methods have not been reported for inducing such cross-linking in organopolysilane polymers by application of heat or UV radiation in the presence of a polyvinyl compound. Furthermore, the chemistries of carbon-based polymers and organopolysilane polymers are sufficiently different from each other that it cannot be predicted that any particular reaction observed in the one sort of polymer will have an analogue in the other sort. For example, carbon-based polymers typically may be exposed to elemental halogens without degradation of the carbon chain of the polymer. Consequently, reactions may be run involving substituents attached to the carbon chain employing elemental halogens as reactants. In contrast, organopolysilanes undergo scission upon exposure to elemental halogens with the result that corresponding reactions with substituents of the silicon chain cannot be run without disrupting the polymer. Likewise, carbon-based polymers tend to be relatively impervious to ultraviolet radiation, whereas photodegradation occurs readily in many organopolysilanes.

BRIEF SUMMARY OF THE INVENTION

The method of the invention summarized in that a method for cross-linking organopolysilane polymers includes the step of mixing an organopolysilane with a cross-linking agent to make a reaction mixture, the cross-linking agent including molecules having at least two carbon-carbon double bonds and a ratio of such bonds to the molecular weight of the molecule no less than one to one hundred fifty. The method further includes inducing radical formation in the organopolysilane of the reaction mixture using a means of inducing radical formation appropriate for the number of carbon-carbon double bonds present in the molecules of the cross-linking agent. By this means, a reaction product is formed including cross-linked organopolysilane polymers. A primary object of the invention is to provide a method for inducing cross-linking in organopolysilane polymers.

A second object of the invention is to provide such a method in which cross-linking may be stimulated by application of heat to the polymer.

Another object of the invention is to provide such a method in which UV radiation may be used to stimulate such cross-linking.

Other objects, features, and advantages of the invention will be apparent from the following detailed description of a preferred embodiment of the method of the invention for cross-linking organopolysilane polymers.

DETAILED DESCRIPTION OF THE PREFERRED EMBODIMENT

Expressed generally, the preferred method of the invention for cross-linking organopolysilane polymers includes the step of mixing an organopolysilane with a cross-linking agent to make a reaction mixture. The cross-linking agent includes molecules having two or more carbon-carbon double bonds and preferably also having a ratio of such bonds to the molecular weight of the molecule of not less than 1 to 150. Preferred examples of cross-linking agents are those that include molecules having two or more vinyl groups. Radical formation then is induced in the organopolysilane of the reaction mixture, to produce a reaction product including cross-linked organopolysilane polymers. As shall be discussed below, choice of particular means of inducing radical formation may be required so that the means chosen is appropriate for the number of carbon-carbon double bonds present in the molecules of the cross-linking agent.

Compounds suitable for use as cross-linking agents must have at least two carbon-carbon double bonds, as is disclosed above, and preferably also have the disclosed minimum ratio of such double bonds to the molecular weight of the compound. Certain of such suitable compounds are further characterized by their ability to combine with themselves to form a cross-linked polymer when placed in the presence of suitable chemical radicals under proper reaction conditions. Thus, the cross-linking agents used in the examples set forth below all form cross-linked polymers when intimately mixed with and then heated in the presence of a conventional chemical radical initiator, such as those chemical radical initiators described in the examples. Such cross-linked polymers are gels that are insoluble in a nonpolar solvent. Not all of the compounds suitable for use as cross-linking agents will so form a cross-linked polymer, but all compounds that do so and have the other characteristics disclosed above are useable as cross-linking agents in the method of the invention.

Various procedures may be employed to induce radical formation. Thus, radical formation may be induced by introducing a heat activiated chemical radical initiator into the reaction mixture and then heating the reaction mixture. Benzoyl peroxide and azo-bis(isobutyronitrile) each are examples of satisfactory chemical radical initiators, and other comparable initiators are known to those skilled in the art. Alternatively, radicals may be induced by exposure of an organopolysilane capable of photolytic radical production to electromagnetic radiation of a selected wavelength. Preferably a wavelength in the ultraviolet range between about 200 mm and 400 mm is used. The preferred wavelength is from approximately 250 mm to 350 mm. When photolytic radical production is employed to induce radical formation, no chemically effective quantity of chemical radical initiator and no heating are necessary.

Methods for cross-linking organopolysilanes using one or the other of these two methods of inducing radical formation shall be referred to hereinafter in the following way. Those using the first method (employing a chemical radical initiator and heat) shall be referred to generally as "thermally induced" cross-linking. Those utilizing the second (employing electromagnetic radiation) shall be referred to as "photolytic" cross-linking. When radical formation is induced photolytically, a cross-linking agent including molecules having as few as two or more carbon-carbon double bonds is sufficient to allow photolytic cross-linking. Such a cross-linking agent must have molecules having four or more carbon-carbon double bonds in order to reliably achieve cross-linking when a chemical radical initiator and heat are used in thermally induced cross-linking, although cross-linking sometimes can be achieved when only three such bonds are present.

With reference to thermally induced cross-linking, of the two particular chemical radical initiators referred to above as typical, benzoyl peroxide is preferred when it is desirable to avoid foaming of the cross-linked polymer. In contrast, azo-bis(isobutyronitrile) produces nitrogen gas when the reaction mixture is heated, causing foaming in the cross-linked polymer. Those skilled in the art are well aware of such qualities of commonly used chemical radical initiators and are capable of selecting for desirable qualities without significant amounts of experimentation.

The mole ratio of chemical radical initiator to cross-linking agent is preferred to be at least 1:2 for thermally induced cross-linking to occur reliably. The amount of cross-linking agent necessary to achieve cross-linking varies. Thus, when the cross-linking agent is 1,6-bis(trivinylsilyl)hexane, a 10 weight percent amount of the cross-linking agent is sufficient to achieve significant cross-linking in a sample of phenylmethylpolysilane in which the average molecular weight is approximately $10^4$. A 30 to 40 weight percent amount of the same cross-linking agent is necessary to accomplish comparable cross-linking in phenylmethylpolysilane oligomers having a molecular weight of approximately 1200.

With either thermally induced or photolytic cross-linking, the reaction mixture is best prepared by the intimate intermixing of the organopolysilane, the chemical radical initiator (if any), and the cross-linking agent. Preferably the reactants to be mixed are dissolved in a suitable organic solvent such as benzene. After the solution is mixed, the benzene may then be removed under reduced pressure, leaving a reaction mixture that is intimately intermixed.

In thermally induced cross-linking, the reaction mixture then is heated to a temperature sufficient to cause radical formation in the chemical radical initiator. The temperature is maintained for a time sufficient for the reaction to progress to a desired extent. Typically a reaction time of approximately 10 minutes is sufficient, during which time the reaction mixture may yellow. Once the reaction mixture is cooled, the presence of cross-linking can be detected by dissolving a sample of the reaction product in a suitable non-polar solvent such as toluene. If a gel fraction appears in the solution, cross-linking has occurred.

The exact chemical steps by which thermally induced cross-linking proceeds are not known. It is theorized that cross-linking occurs via the steps outlined below as the Reaction Scheme, in which X—X represents a chemical radical initiator divisible into at least two radicals X, which may or may not be identical to each other, and $(Vi_3)Si-R-Si(Vi)_3$ represents a typical cross-linking agent.

represents an organopolysilane.

Reaction Scheme

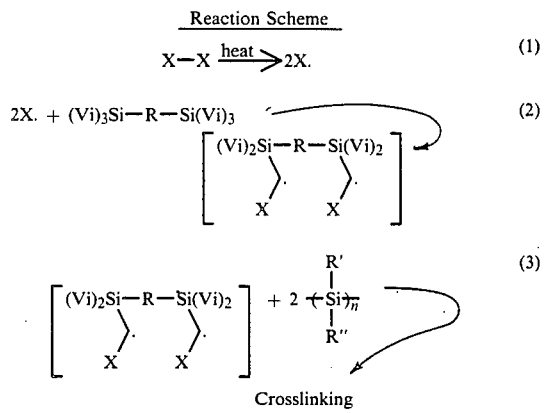

Crosslinking

It may be that cross-linking occurs between the side groups on the organopolysilane polymers or between the silicon strands forming the backbones of the polymers. It should be emphasized that the scheme presented above is no more than a theory that is presented solely as an aid to understanding and in no way is intended to limit the scope of the invention.

The photolytic cross-linking of organopolysilanes can be achieved by making a reaction mixture in the manner described above having at least one weight percent of a cross-linking agent of the sort described above. The reaction mixture is then placed in a suitable container, such as a glass flask. The container is flushed with a generally inert gas, of which argon and nitrogen are typical examples. The reaction mixture is then exposed to selected electromagnetic radiation, as described above, and photolyzed for a period of time sufficient to induce cross-linking. In practice, a period of at least 10 hours typically is required. The reaction product may then be tested for cross-linking by dissolving a portion of it in an appropriate non-polar solvent such as toluene and checking for gel formation.

Once again, the exact chemical mechanism associated with photolytic cross-linking is not known. However, it is theorized that it is similar to the mechanism presented as the Reaction Scheme, above, except that the function of the chemical radical initiator is fulfilled by photolyzed organopolysilane.

In the examples set forth below of both thermally induced and photolytic cross-linking, a variety of cross-linking agents are used. In addition to several previously known chemical species, compounds constituting a new group of cross-linking agents have been discovered that are believed not to have been reported before in the literature. The compounds are alpha, omega-bis-(trivinylsilyl)alkanes having the formula $(Vi)_3Si-R-Si(Vi)_3$ where R is a saturated carbon chain having from 1 to 10 carbon atoms. These compounds may be made from the reaction of vinylmagnesium bromide with the corresponding chlorosilanes. Vinylmagnesium bromide and the chlorosilane to be reacted may be placed in a flask with a mole proportion of a approximately 6 to 1. Preferably, the chlorosilane is dissolved in a suitable solvent, such as diethyl ether. The vinylmagnesium bromide is similarly dissolved in a suitable solvent, such as tetrahydrofuran. The dissolved vinyl magnesium bromide is added drop wise to the chlorosilane solution in an inert atmosphere, such as a nitrogen atmosphere. The chlorosilane solution is stirred as the vinylmagnesium bromide is added to it. After a sufficient period has passed to complete the reaction, hydroquinone dissolved in ethanol is added to the reaction. The solvents then are removed under reduced pressure, and the materials remaining are washed with hexane. The hexane then is removed under reduced pressure, leaving the alpha, omega-bis-(trivinylsilyl)alkanes.

The two cross-linking agents referred to in the examples below and made by the method just disclosed are 1,2-bis(trivinylsilyl)ethane (boiling point 71° C. at 4 TORR) and 1,6-bis(trivinylsilyl)hexane (boiling point 122° C. at 4 TORR).

The following are particular examples in which cross-linking was achieved by the method of the invention.

EXAMPLE 1

An organopolysilane polymer was dissolved in benzene, together with a cross-linking agent and a chemical radical initiator. The organopolysilane polymer utilized was a phenylmethyl polysilane having an average molecular weight of approximately $10^4$. The cross-linking agent was triallyl 1,3,5-benzene tricarboxylate. The chemical radical initiator was benzoyl peroxide. Weight percents of the organosilane polymer, cross-linking agent, and chemical radical initiator were 61.8, 30.8, and 7.4, respectively. After all three reactants had dissolved in benzene and been mixed, the benzene was removed by evaporation under reduced pressure to leave a reaction mixture. The reaction mixture was then heated for 10 minutes to a temperature less than a temperature sufficient to cause visually apparent, substantial decomposition of the reactants but in excess of 100° C. During this time, the material yellowed. The reaction mixture was then allowed to cool to room temperature. Toluene was added to a sample of the reacted product in an amount sufficient to completely dissolve the sample. A gel fraction appeared in the toluene, indicating that cross-linking had occurred.

EXAMPLE 2

The method of Example 1 was followed with $(Vi)_4Si$ used as the cross-linking agent. Weight percents of organosilane polymer, cross-linking agent, and chemical radical initiator were 75.7, 15.2, and 9.1 percent, respectively. A gel fraction was again observed in the toluene solution of the reaction product, indicating that cross-linking had occurred.

EXAMPLE 3

The method of Example 1 was followed, using $[Me(Vi)_2Si-]_2O$ as the cross-linking agent. The weight percents of organopolysilane polymer, cross-linking agent, and chemical radical initiators were 70.4, 21.1, and 8.5, respectively. A gel fraction was observed in the toluene solution of the reaction products, indicating that cross-linking had occurred.

EXAMPLE 4

The method of Example 1 was followed utilizing $(MeViSiO)_4$ as the cross-linking agent. Weight percents of organopolysilane polymer, cross-linking agent, and chemical radical initiator were 62.2, 30.5, and 7.3, respectively. Cross-linking was observed to have occurred.

EXAMPLE 5

The method of Example 1 was followed, utilizing 1,2-bis(trivinylsilyl)ethane as the cross-linking agent. The weight percents of organopolysilane polymer, cross-linking agent, and chemical radical initiator were 84.0, 10.1, and 5.9, respectively. Cross-linking was found to have occurred.

EXAMPLE 6

The method of Example 1 was followed, utilizing 1,6-bis(trivinylsilyl)hexane as the cross-linking agent. The organosilane polymer used was a phenylmethyl polysilane and per alkyl polysilane copolymer having an average molecular weight less than $10^4$. The chemical radical initiator was azo-bis(isobutyronitrile). The weight percents of organopolysilane polymer, cross-linking agent, and chemical radical initiator were 87.6, 8.3, and 4.1, respectively. Cross-linking was observed to have occurred.

EXAMPLE 7

The method of Example 1 was followed, utilizing 1,2-bis(trivinylsilyl)ethane as the cross-linking agent and $[-(n-HexMeSi)_m(c-HexMeSi)_n-]_x$ having an average molecular weight in excess of $10^5$ as the organosilane polymer. Weight percents of organosilane polymer, cross-linking agent, and chemical radical initiator were 86.6, 8.6, and 4.8, respectively. Cross-linking was observed to have occurred.

EXAMPLE 8

Photolytic cross-linking of an organopolysilane polymer was achieved in the following way. A sample of organopolysilane polymer was dissolved in benzene, together with a selected amount of a cross-linking agent. The organopolysilane was phenylmethyl polysilane having an average molecular weight of approximately $10^4$. The cross-linking agent was 3,9-divinyl-2,4,8,10-tetraoxaspiro[5.5]undecane. Weight percents of the organopolysilane and cross-linking agent were 86.2 and 13.8, respectively. The benzene was then evaporated under reduced pressure, leaving the two substances intimately mixed as a reaction mixture. The reaction mixture then was irradiated with electromagnetic radiation having a wavelength of approximately 350 nm for a period of 15 hours to allow the cross-linking reaction to proceed. A sample of the products of the reaction was dissolved in toluene, and a gel fraction was observed, indicating that cross-linking had occurred.

EXAMPLE 9

The procedure of Example 8 was followed utilizing 1,4-cyclooctadiene as the cross-linking agent, with weight percents of organopolysilane and cross-linking agent being 89.3 and 10.7, respectively. The reaction mixture was subjected to irradiation for a period of 13.5 hours. A gel fraction was observed when a portion of the reaction product was dissolved in toluene, indicating that cross-linking had occurred.

EXAMPLE 10

The procedure of Example 8 was followed utilizing 1,9-decadiene as the cross-linking agent, with weight percents of organopolysilane and cross-linking agent being 83.3 and 16.7, respectively. The reaction mixture was subjected to irradiation for a period of 15.5 hours. A gel fraction was observed when a portion of the reaction product was dissolved in toluene, indicating that cross-linking had occurred.

EXAMPLE 11

The procedure of Example 8 was followed utilizing $(ViMe_2Si)_2O$ as the cross-linking agent, with weight percents of organopolysilane and cross-linking agent being 88.2 and 11.8, respectively. The reaction mixture was subjected to irradiation for a period of 15 hours. A gel fraction was observed when a portion of the reaction product was dissolved in toluene, indicating that cross-linking had occurred.

EXAMPLE 12

The procedure of Example 8 was followed utilizing 1,2-bis(trivinylsilyl)ethane as the cross-linking agent, with weight percents of organopolysilane and cross-linking agent being 99.0 and 1.0, respectively. The reaction mixture was subjected to irradiation for a period of 22 hours. A gel fraction was observed when a portion of the reaction product was dissolved in toluene, indicating that cross-linking had occurred.

EXAMPLE 13

The method of Example 8 was followed in which the organopolysilane was $[-(n-HexMeSi)_m(c-HexMeSi)_n-]_x$ having an average molecular weight of approximately $10^5$. The cross-linking agent was 1,6-bis(trivinylsilyl)hexane. The weight percents of organopolysilane and cross-linking agent were 90.9 and 9.1, respectively. The reaction mixture was exposed to electromagnetic radiation having a wavelength of approximately 300 nm for a period of 19 hours. A gel fraction was observed when a portion of the reaction products was dissolved in toluene, indicating that cross-linking had occurred.

It shall be understood that the examples set forth are only particular embodiments of the method set forth more generally above and in no way limit the invention. Alternative embodiments of the preferred method of the invention of cross-linking organopolysilane polymers have been disclosed. However, it will be apparent that other materials and steps may be utilized in carrying out the method of the invention, as would be apparent to one skilled in the art. Therefore, it is understood that the present invention is not limited to the preferred embodiments disclosed above. Instead, it embraces all such modified forms thereof as come within the scope of the following claims.

What is claimed is:

1. A method for cross-linking organopolysilane polymers comprising the steps of:
    (a) mixing an organopolysilane with a cross-linking agent to make a reaction mixture, the cross-linking agent including molecules having at least two carbon-carbon double bonds and a ratio of such bonds to the molecular weight of the molecule no less than 1 to 150; and
    (b) inducing radical formation in the organopolysilane of the reaction mixture using a means of inducing radical formation appropriate for the number of carbon-carbon double bonds present in the molecules of the cross-linking agent to cause formation of a reaction product including cross-linked organopolysilane polymers.

2. The method of claim 1 wherein the cross-linking agent includes at least two vinyl groups.

3. The method of claim 1 wherein the molecule of the cross-linking agent that has at least two carbon-carbon double bonds is capable of combining with like molecules to form a cross-linked polymer when placed in the presence of chemical radicals.

4. The method of claim 1 wherein the cross-linking agent is an alpha, omega-bis-(trivinylsilyl)alkane.

5. The method of claim 4 wherein the cross-linking agent is 1,2-bis(trivinylsilyl)ethane.

6. The method of claim 4 wherein the cross-linking agent is 1,6-bis(trivinylsilyl)hexane.

7. The method of claim 1 wherein the step of inducing radical formation in the organopolysilane includes introducing a chemical radical initiator into the reaction mixture and then heating the reaction mixture, and wherein the cross-linking agent has four or more carbon-carbon double bonds.

8. The method of claim 1 wherein the step of inducing radical formation in the organopolysilane includes exposing the reaction mixture to electromagnetic radiation of a selected wave length no less than 200 mm.

9. The method of claim 8 in which the reaction mixture contains no chemically effective quantity of a chemical radical initiator separate from the organopolysilane.

10. The method of claim 8 wherein the electromagnetic radiation has a wave length within the range 250 to 350 mm.

11. An alpha, omega-bis(trivinylsilyl)alkane having the formula $(Vi)_3Si-R-Si(Vi)_3$ wherein R is a saturated carbon chain including from 1 to 10 carbon atoms.

12. The compound of claim 11 wherein the alpha, omega-bis(trivinylsilyl)alkane is 1,2-bis(trivinylsilyl)ethane.

13. The compound of claim 11 wherein the alpha, omega-bis(trivinylsilyl)alkane is 1,6-bis(trinvinylsilyl)hexane.

* * * * *